United States Patent [19]
Zarge et al.

[11] Patent Number: 5,590,248

[45] Date of Patent: Dec. 31, 1996

[54] METHOD FOR REDUCING THE COMPLEXITY OF A POLYGONAL MESH

[75] Inventors: Jonathan A. Zarge, Woburn, Mass.; William J. Schroeder, Schenectady, N.Y.

[73] Assignee: General Electric Company, Schenectady, N.Y.

[21] Appl. No.: 394,044

[22] Filed: Feb. 24, 1995

Related U.S. Application Data

[63] Continuation of Ser. No. 815,772, Jan. 2, 1992, abandoned.

[51] Int. Cl.⁶ ................................................. G06T 17/20
[52] U.S. Cl. ............................................ 395/121; 395/120
[58] Field of Search .................. 395/119–121, 123–125, 395/127–130, 133, 139, 141; 358/224

[56] References Cited

U.S. PATENT DOCUMENTS

| | | | |
|---|---|---|---|
| Re. 33,973 | 6/1992 | Kriz et al. ........................... | 358/224 |
| 4,631,690 | 12/1986 | Corthout et al. ..................... | 395/120 |
| 4,912,664 | 3/1990 | Weiss et al. ......................... | 395/141 X |
| 5,010,501 | 4/1991 | Arakawa ............................... | 395/120 |
| 5,107,444 | 4/1992 | Wu ...................................... | 395/119 |
| 5,440,674 | 8/1995 | Park .................................... | 395/123 |
| 5,454,068 | 9/1995 | Ramanujam ........................... | 395/119 |

OTHER PUBLICATIONS

Foley et al. (1990).
Prusinklewicz et al. (1986).

*Primary Examiner*—Almis R. Jankus
*Attorney, Agent, or Firm*—David C. Goldman; Marvin Snyder

[57] ABSTRACT

A method for reducing the complexity of a polygonal mesh representative of the surface of an object to be displayed such as for medical imaging purposes systematically removes features from the mesh and reconnects the modified mesh in such a way as to preserve the original shape and topology of the mesh. The procedure removes both vertices and polygons from a polygonal mesh either alone or in combination. In order to reduce the number of polygons in an object for which a mesh has been generated, the method of the present invention repeats the decimation process until a desired number of polygons is achieved.

19 Claims, 6 Drawing Sheets

METHOD FOR REDUCING THE COMPLEXITY OF A POLYGONAL MESH

This application is a Continuation of application Ser. No. 07/815,772, filed Jan. 2, 1992 now abandoned.

BACKGROUND OF THE INVENTION

A common problem in computational science is the need to represent the geometry of an object or the structure of data. One method for representing such objects is to use a polygonal mesh. A system and method that generates a large polygonal mesh is described in U.S. Pat. No. 4,710,876, assigned to the assignee of the present invention. Other techniques, such as automatic mesh generation or terrain mapping from satellite data are also capable of generating large polygonal meshes. For example, the complex, curved surface of a human tooth can be approximated by using many thousands of triangles (or other polygon types) joined along their common edges.

The ability to represent geometry is important for many reasons. In computer graphics, polygonal meshes are used in the lighting and shading operations to generate images. Polygonal meshes are used in numerical analysis to represent the boundary of solid objects. From these representations, equations can be developed to solve such complex problems as heat flow, structural response, or electromagnetic propagation. Another application is in geometric modeling, where polygonal meshes are often used to determine object mass, center of gravity, and moments of inertia.

In the past, polygonal meshes were typically comprised of hundreds to thousands of polygons, and computer hardware and software has been designed to process such volumes of information. However, recent advances in computational science have resulted in techniques that generate hundreds of thousands or even millions of polygons. Such large numbers, while capturing the geometry of the object very precisely, often overwhelm computer systems. For example, most graphics systems today are incapable of rendering a million polygons at a speed that is not detrimental to interactive computation.

The basic problem is that techniques that generate large polygonal meshes are extremely valuable and cannot be easily modified to produce fewer polygons. Hence a general technique for reducing, or decimating, a mesh composed of a large number of polygons to one containing fewer polygons is necessary. Furthermore, for the decimation process to be truly effective, it must preserve the topological and shape properties of the original polygonal mesh.

SUMMARY OF THE INVENTION

In accordance with the present invention, a method for reducing the complexity of a polygonal mesh is provided. The method preserves the topological properties and shape of the original mesh. The method analyzes each vertex in the mesh to determine if it is superfluous and removes it and all of the triangles connected to it if it is superfluous. The polygon created by removing a vertex is filled (retriangulated) with new triangles according to an algorithm disclosed herein. The method further includes the step of removing triangles (consolidation) from the mesh if the triangles are relatively small compared to neighboring triangles. The method further removes edges from the mesh if they are relatively short as compared with neighboring edges.

The present invention is preferably implemented as a computer programmed to perform the method steps disclosed. Such a computer program would allow a user to specify various thresholds herein disclosed to control the representational accuracy of the resulting mesh. Such a program may also be run in an iterative fashion until a desired reduction in mesh complexity has been achieved.

DETAILED DESCRIPTION OF THE INVENTION

The method of the present invention can be viewed as three major processes, vertex removal, triangle consolidation and polygon retriangulation. These processes are described in detail in FIGS. 1–3 respectively.

The present inventive method takes as input a triangular mesh which has been created using, for example, the method described in U.S. Pat. No. 4,710,876. Such a triangular mesh consists of vertices, or points in space, having x, y, and z co-ordinates in relation to a common origin. The mesh of vertices is interconnected by line segments polygons which form an approximation to a surface being modeled. The goal of the vertex removal process is to remove superfluous vertices, that is vertices which when removed will not denigrate the shape and topological properties of the original mesh by more than a selected threshold.

Figure 1:
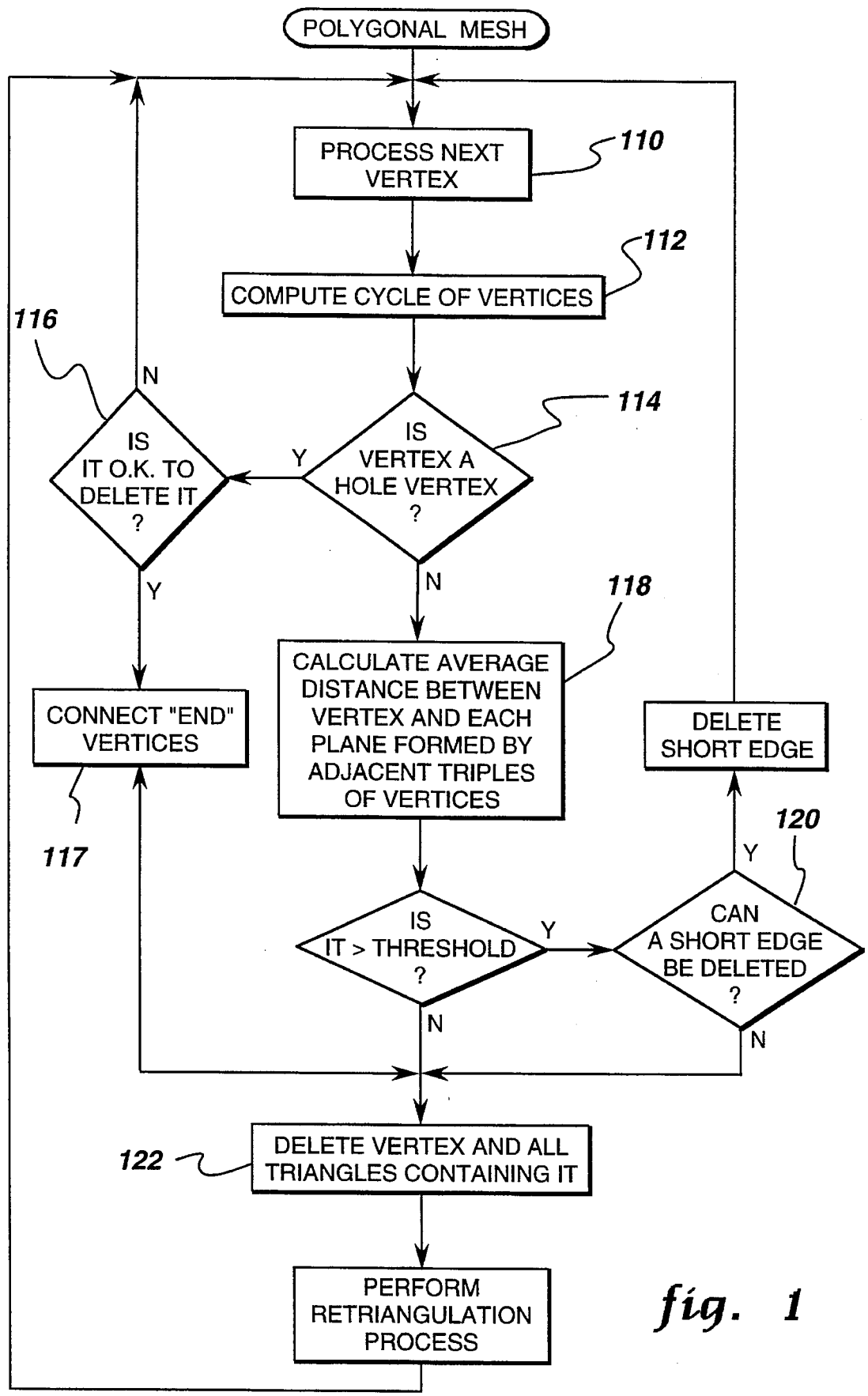
FIG. 1 is a flow diagram of a method for removing vertices from a polygonal mesh according to the present invention.
Figure 4:
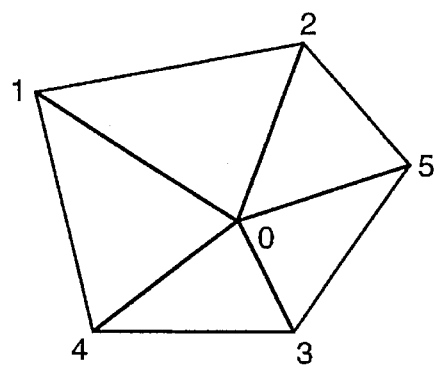
FIG. 4 illustrates determining a cycle of vertices.

In FIG. 1, at function block 110, individual vertices are selected for processing from the input mesh until all vertices in the mesh have been processed. For purposes of clarity, the vertex being processed (through FIG. 1) will be referred to hereinafter in the figures and in the written description as vertex 0. At function block 112, the cycle of vertices is computed for the vertex 0. This is accomplished by identifying and listing all of the triangles which use vertex 0. The cycle of vertices is produced by scanning these triangles and determining which of these triangles share edges (line segments) with other triangles in the list. If two triangles share an edge, then the vertices of those triangles become adjacent in the cycle of vertices. This is illustrated further in FIG. 4. For vertex 0, the triangles identified are (401) (503) (043) (210) and (205) and the cycle of vertices is 5, 2, 1, 4, and 3.

Figure 5:
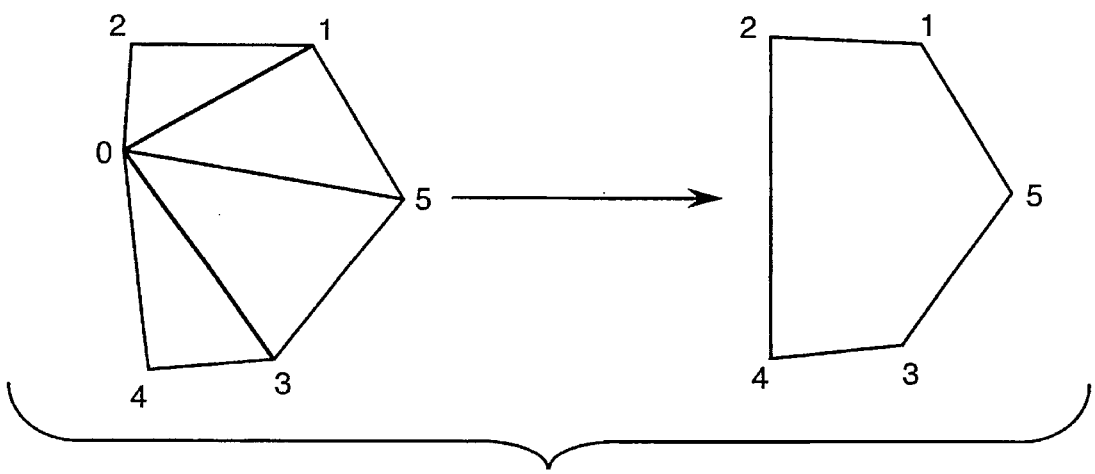
FIG. 5 illustrates hole vertex deletion.

If the vertices do not form a complete cycle, then the vertex is designated a hole vertex. In this case there are two "end" vertices since the vertices do not form a cycle. A hole vertex can be deleted if the distance between the line formed between the two end vertices and the vertex to be deleted is less than a pre-selected decimation threshold. The two end vertices are connected at function block 117 and processing proceeds to block 122. At decision block 114 in FIG. 1, if the vertex is a hole vertex, processing proceeds to decision block 116. FIG. 5 illustrates a non-cyclical set of vertices around a hole vertex 0. The distance between the line formed between the two end vertices 2 and 4 and vertex 0 is computed and if the distance is less than a pre-selected decimation threshold, the vertex 0 is deleted resulting in the polygon defined by vertices 2, 1, 5, 3, and 4. The present method then proceeds to the retriangulation process as described hereinbelow.

If the vertex is not a hole vertex, the present method proceeds to function block 118 where triples of vertices (three adjacent vertices in the cycle) are used to form planes, the number of planes being equal to the number of vertices. As an example, in FIG. 4, the planes would be formed from the following triples of vertices: (1, 4, 3), (4, 3, 5), (3, 5, 2), (5, 2, 1), and (2, 1, 4). The distance from vertex 0 to each of the planes is averaged and compared to the pre-selected decimation threshold. If the average is less than the decimation threshold, vertex 0 is deleted at function block 122, leaving a temporary hole in the mesh which is filled during the retriangulation process described hereinafter. If the vertex 0 is only associated with two triangles, then the distance which is compared against the decimation threshold is the distance between the vertex and the line formed by the two other vertices in the other triangles.

Figure 6:
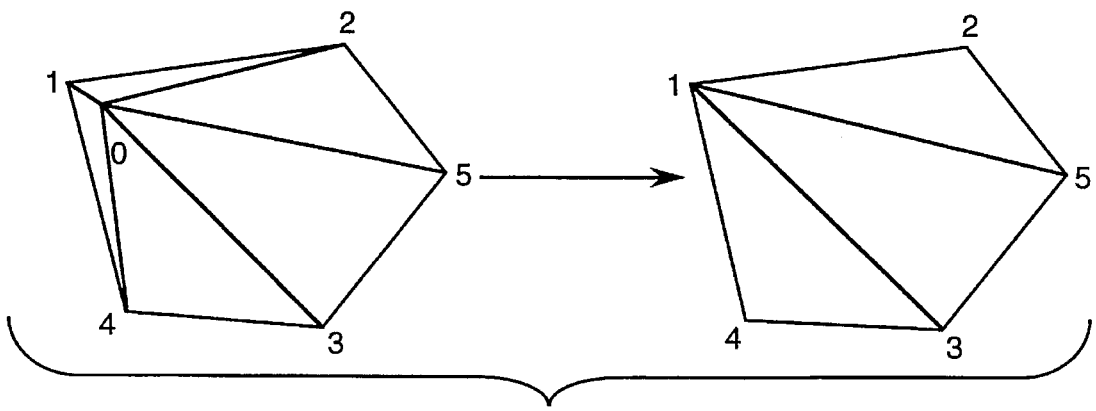
FIG. 6 illustrates short edge deletion.

If vertex 0 is not deleted using the test just described, the method proceeds to decision block 120 to test whether any edge connected to vertex 0 can be deleted. The lengths of the edges between vertex 0 and the vertices in the cycle are averaged. If the ratio between the average edge length and the shortest edge is less than a pre-selected parameter called the short edge threshold, the vertex is removed by removing the two faces that shared the short edge. Short edge removal is illustrated in FIG. 6.

Figure 2:
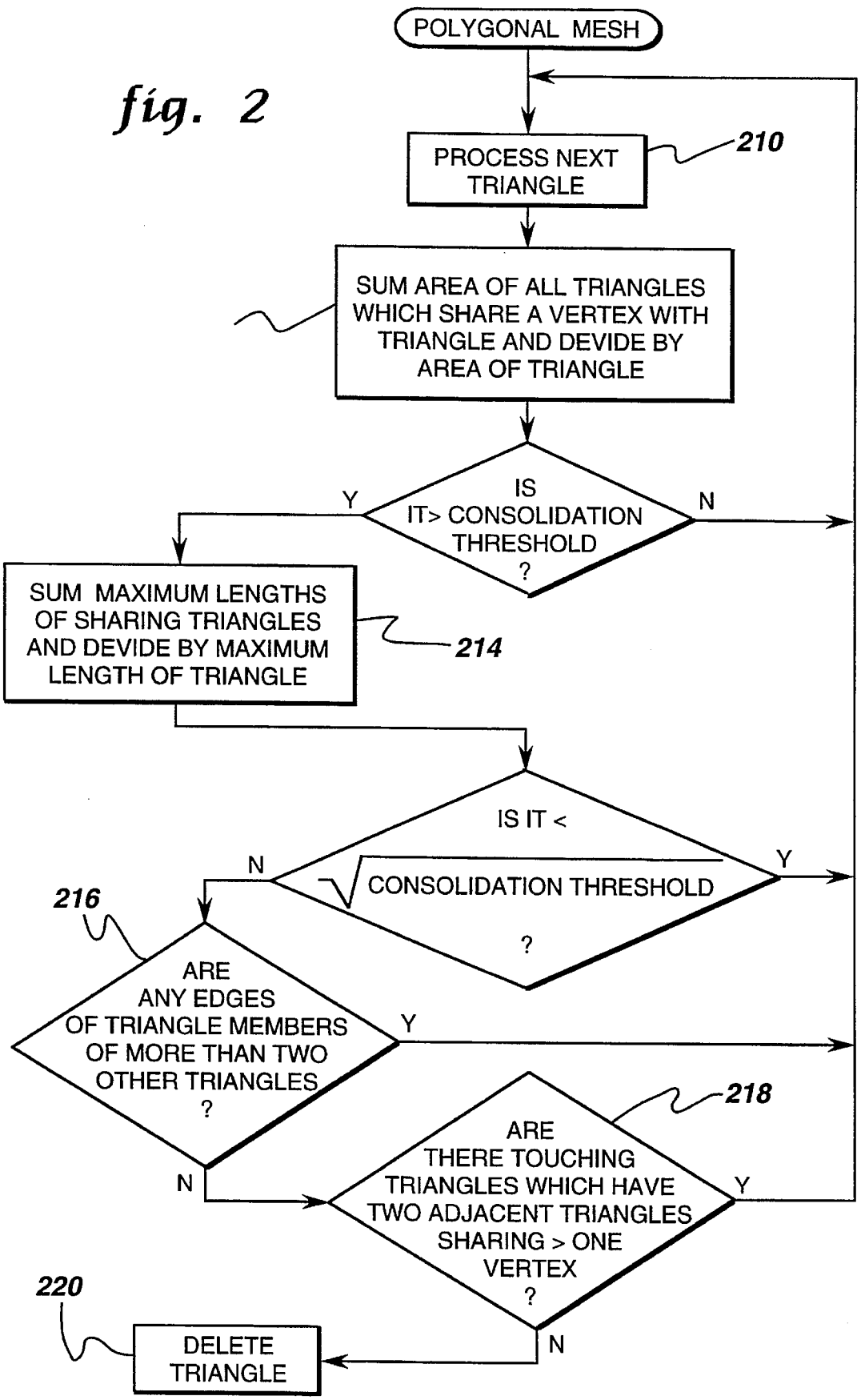
FIG. 2 is a flow diagram of a method for removing triangles from a polygonal mesh according to the present invention.
Figure 7:
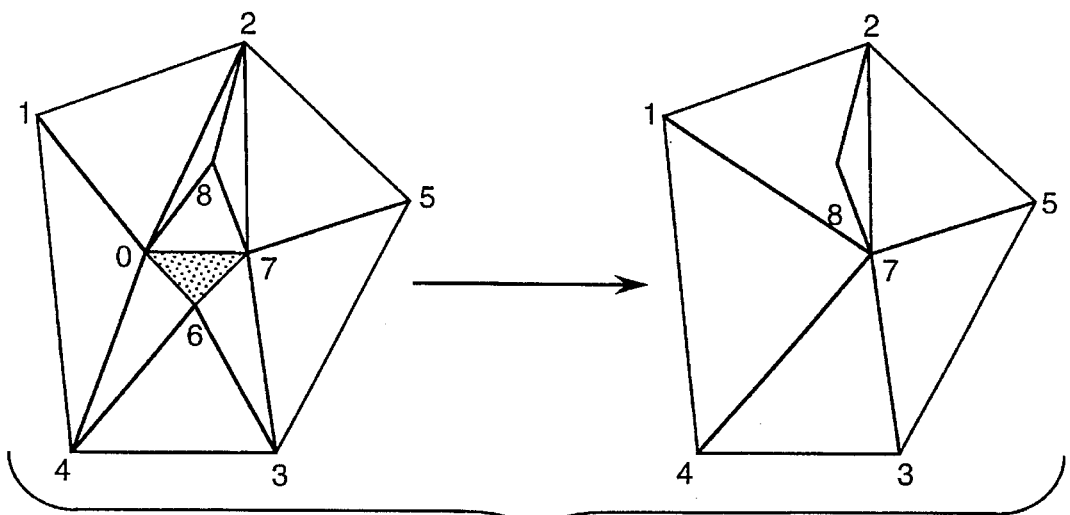
FIG. 7 illustrates a constraint on triangle consolidation.
Figure 8:
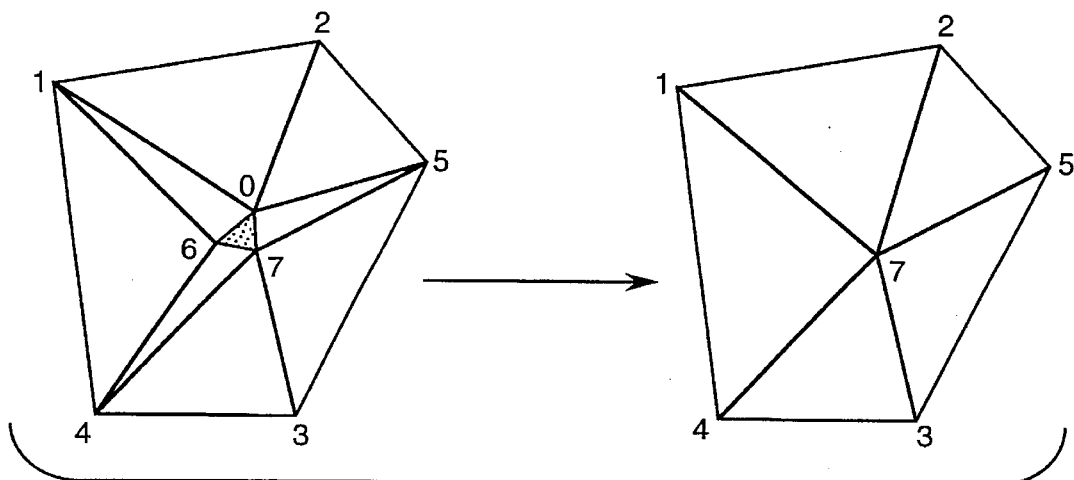
FIG. 8 illustrates triangle consolidation.

In addition to vertex deletion, the other major decimation process of the present invention is called polygon consolidation. For this process, all polygons in the object are processed. FIG. 2 details the steps of the consolidation process. First, at 210, a polygon is selected from the input mesh until all polygons are processed. Next, at function block 212, the sum of the area of all the triangles which share a vertex with the polygon is calculated. If the ratio between this sum and the area of the polygon is greater than a pre-selected parameter called the consolidation threshold, the polygon is passed on to the next decision block 214, otherwise processing returns to 210 where the next polygon is processed. At decision block 214 the maximum lengths of the polygons which share a vertex with the triangle being processed are summed and divided by the maximum length of the polygon being processed. If this ratio is less than the square root of the consolidation threshold, the polygon is not deleted and processing continues at 210; otherwise processing proceeds to decision block 216. At 216, if any of the edges of the triangle are members of more than two other polygons, the polygon is not deleted. At decision block 218, it is determined whether there is a "touching" polygon which has triangles adjacent to it sharing more than one common vertex. A touching polygon is one which shares an edge with the polygon being processed. This is illustrated in FIG. 7, where the touching triangles are (0, 8, 7), (6, 7, 3), and (6, 3, 4). The triangle being processed is (0, 7, 6). "Touching" triangle (0, 8, 7) has two adjacent triangles (0, 2, 8) and (7, 8, 2) which share more than one vertex 8 and 2. The reason why this situation would prevent the deletion of triangle (0, 7, 6) is that it would cause two triangles to be co-incident. Finally if it is determined that the polygon meets all of the conditions for deletion, it is deleted at function block 220. When a triangle is deleted, two of its three vertices are deleted along with the triangle and the three triangles which share an edge with the triangle. FIG. 8 illustrates the process of polygon consolidation.

Figure 3:
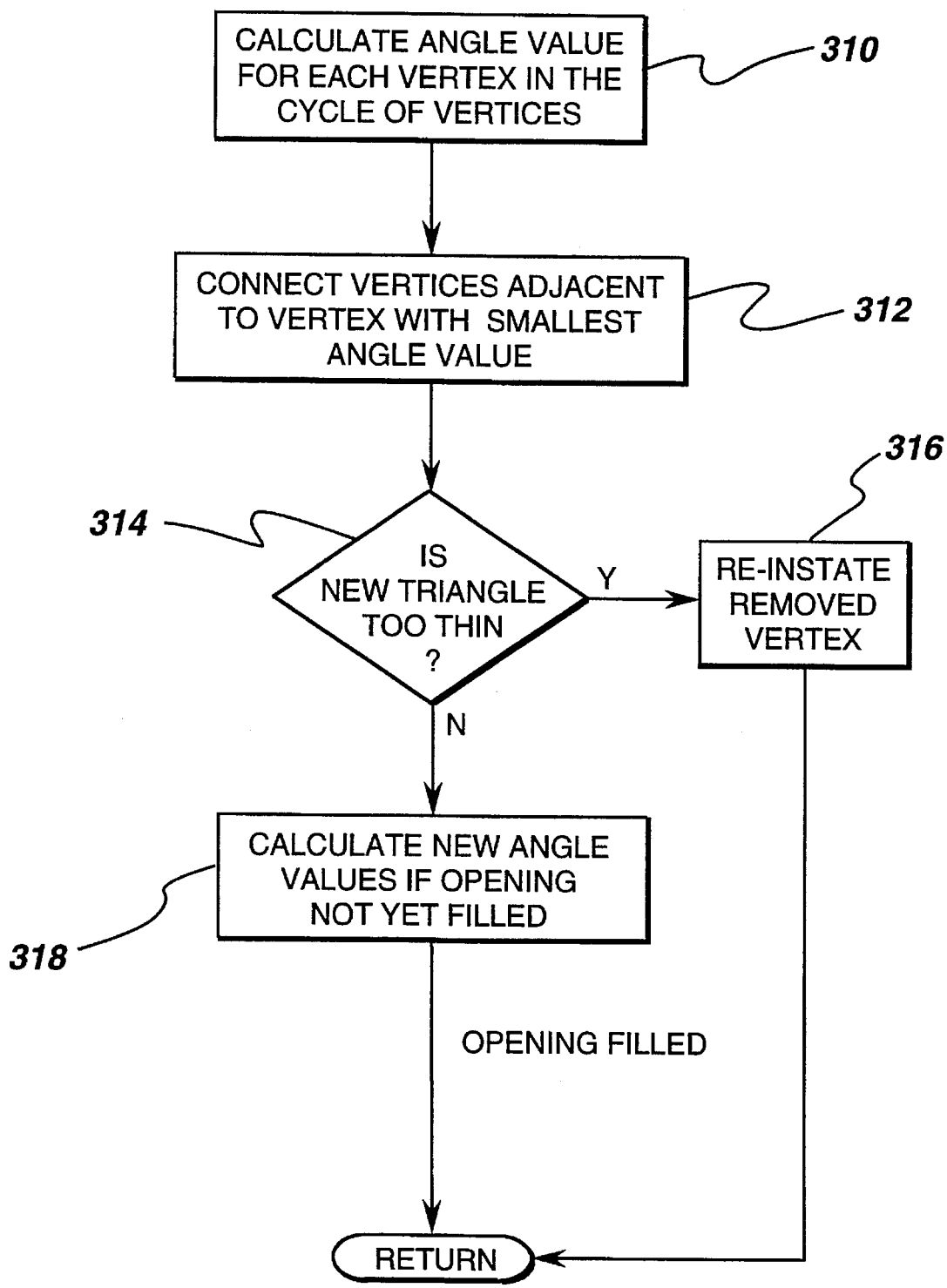
FIG. 3 is a flow diagram of a method for retriangulation according to the present invention.

The final process to be described is retriangulation which is shown in detail in FIG. 3. When during the vertex deletion process, a vertex is deleted, the retriangulation process must be performed to create new triangles to fill in the gap left by the deleted vertex.

Figure 9:
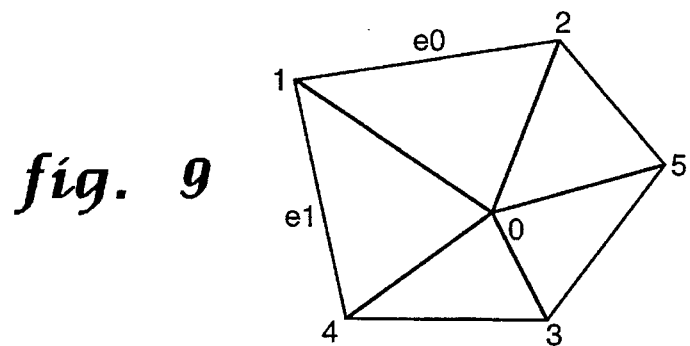
FIG. 9 illustrates angle value calculation.
Figure 10:
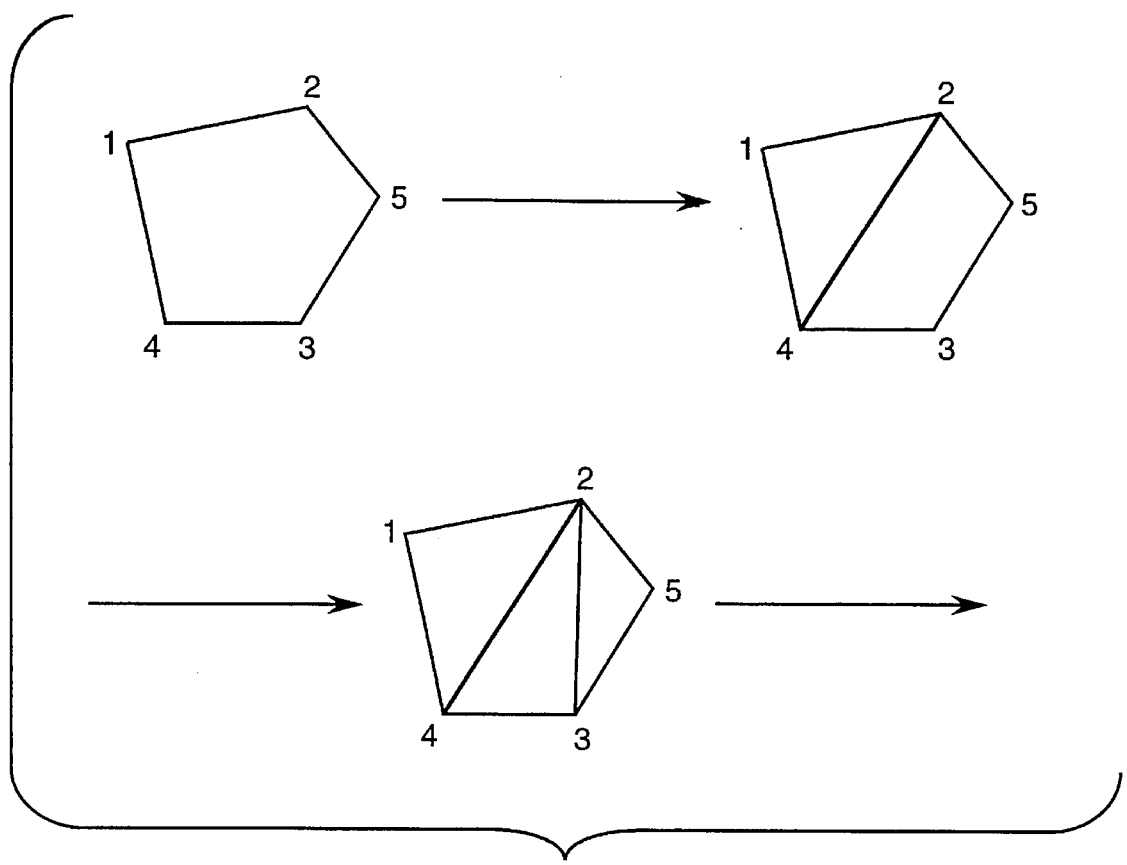
FIG. 10 illustrates retriangulation of a polygon.
Figure 11:
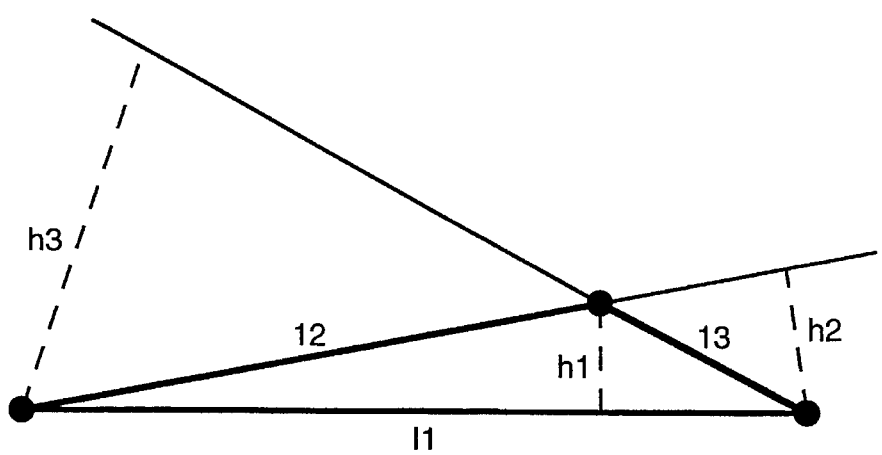
FIG. 11 illustrates the computation of thinness.

In order to determine which triple of vertices is formed into a triangle first, an "angle value" is calculated for each vertex in the cycle at function block 310. FIG. 9 is used to describe the calculation of the angle value for a given vertex. The angle value is composed of two parts which are added together. The first part is the actual angle formed at the vertex. For vertex 1 in FIG. 9, this angle is the angle formed by edges e0 and e1. The second component of the calculation is the angle between the original triangles which contained both the vertex in the cycle and the deleted vertex. In FIG. 9 this is the angle between triangles (4, 0, 1) and (2, 1, 0). The vertex having the lowest sum of two components is found and a triangle is formed by connecting the two vertices adjacent to the vertex having the lowest angle value at function block 312. Next, at decision block 314, the "thinness" of the newly formed triangle is checked. FIG. 11 illustrates the calculation of thinness. If the minimum height to base ratio is less than a threshold called the aspect ratio, then the deleted vertex and the original polygons are reinstated at function block 316. If the triangle passes the thinness test at decision block 314, the process continues at function block 318, if the opening has not been filled with triangles yet. At function block 318 the vertex with the smallest angle value is removed from the cycle of vertices and the angle values for the adjacent vertices are recalculated. The process then repeats at function block 312 until the opening is filled at which point the process ends.

Various modes of carrying out the present invention on an object to be decimated are contemplated and others exist. The most basic mode of operation is to load the polygonal mesh model, set the user specified parameters of decimation threshold, consolidation threshold, short edge threshold, and aspect ratio as described hereinabove, and then execute one iteration. Also, the method can iterate several times at the same threshold level until a constraint is reached. The constraint is the number of vertices deleted during the latest iteration compared to the number of vertices before the iteration. A parameter called the iteration threshold controls this mode; if the iteration threshold is 0% then the method will iterate until the number of vertices deleted on an iteration is zero. The most automated mode of practicing the invention involves automatically incrementing the decimation threshold upward until a target reduction is reached. The user can specify the target reduction as a percent (the number of vertices in the decimated object divided by the number of vertices in the original object) and an increment (a percentage as described below). This method first decimates at a large negative decimation threshold which will allow for hole vertex deletion, short edge deletion, and consolidation. Next the decimation threshold is set to zero, and is then incremented by the desired percentage increment as specified above by the user. The method will increment the threshold until the target reduction is achieved.

What is claimed is:

1. A method for reducing complexity of a polygonal mesh while preserving shape and topology, the method comprising the steps of:

analyzing each vertex in said mesh to determine if regions around the vertex are substantially co-planar;

removing said vertex from said mesh if regions around the vertex are substantially co-planar; and triangulating an opening left by removing said vertex from said mesh.

2. The method of claim 1 further comprising the step of:

removing polygons from said triangulated mesh if said polygons have an area smaller than a first predetermined threshold.

3. The method of claim 2 wherein said step of removing a polygon includes computing a ratio of the area of said polygon to a sum of areas of adjacent polygons and comparing said ratio to said first predetermined threshold, said polygon being removed if said ratio is greater than said first predetermined threshold.

4. The method of claim 1 further comprising the step of:

analyzing each vertex in said mesh to determine if any edge connected to said vertex is co-linear: and removing the co-linear edges.

5. The method of claim 4 wherein said analyzing includes computing a ratio of average edge length of said vertex to its shortest edge length and comparing said ratio to a predetermined short edge threshold, the edge being co-linear if said ratio is less than said predetermined short edge threshold.

6. The method of claim 1 wherein the step of triangulating said opening comprises the steps of:

calculating an angle value for each remaining vertex defining said opening;

removing a vertex with a smallest of said angle values from said opening;

connecting vertices adjacent to said removed vertex forming a triangle;

determining whether a ratio of the triangle height to base length is less than a second predetermined threshold; and replacing said vertex removed if said ratio is less than said second threshold.

7. The method of claim 1 wherein said analyzing includes determining an average distance between the vertex and each plane formed by adjacent vertices and comparing the distance to a third predetermined threshold, the vertex being substantially co-planar for distances less than the third predetermined threshold.

8. A method for reducing complexity of a polygonal mesh while preserving shape and topology, the method comprising the steps of:

analyzing each vertex in said mesh to determine if regions around the vertex are substantially co-planar;

removing said vertex from said mesh if regions around the vertex are substantially co-planar; and triangulating an opening left by removing said vertex from said mesh, wherein said triangulating comprises calculating an angle value for each remaining vertex defining said opening; removing a vertex with a smallest of said angle values from said opening; connecting vertices adjacent to said removed vertex forming a triangle; determining whether a ratio of the triangle height to base length is less than a first predetermined threshold; and replacing said vertex removed if said ratio is less than said first predetermined threshold.

9. The method of claim 8 further comprising the step of:

removing polygons from said triangulated mesh if said polygons have an area smaller than a second predetermined threshold.

10. The method of claim 9 wherein said step of removing a polygon includes computing a ratio of the area of said polygon to a sum of areas of adjacent polygons and comparing said ratio to said second predetermined threshold, said polygon being removed if said ratio is greater than said second predetermined threshold.

11. The method of claim 8 further comprising the step of:

analyzing each vertex in said mesh to determine if any edge connected to said vertex is co-linear; and removing the co-linear edges.

12. The method of claim 11 wherein said analyzing includes computing a ratio of average edge length of said vertex to its shortest edge length and comparing said ratio to a predetermined short edge threshold, the edge being co-linear if said ratio is less than said predetermined short edge threshold.

13. The method of claim 8 wherein said analyzing includes determining an average distance between the vertex and each plane formed by adjacent vertices and comparing the distance to a third predetermined threshold, the vertex being substantially co-planar for distances less than the third predetermined threshold.

14. A method for reducing complexity of a polygonal mesh while preserving shape and topology, the method comprising the steps of:

analyzing each vertex in said mesh to determine if regions around the vertex are substantially co-planar, wherein said analyzing includes determining an average distance between the vertex and each plane formed by adjacent vertices and comparing the distance to a first predetermined threshold, the vertex being substantially co-planar for distances less than the first predetermined threshold;

removing said vertex from said mesh if regions around the vertex are substantially co-planar; and triangulating an opening left by removing said vertex from said mesh.

15. The method of claim 14 further comprising the step of:

removing polygons from said triangulated mesh if said polygons have an area smaller than a second predetermined threshold.

16. The method of claim 15 wherein said step of removing a polygon includes computing a ratio of the area of said polygon to a sum of areas of adjacent polygons and comparing said ratio to said second predetermined threshold, said polygon being removed if said ratio is greater than said second predetermined threshold.

17. The method of claim 14 further comprising the step of:

analyzing each vertex in said mesh to determine if any edge connected to said vertex is co-linear; and removing the co-linear edges.

18. The method of claim 17 wherein said analyzing includes computing a ratio of average edge length of said vertex to its shortest edge length and comparing said ratio to a predetermined short edge threshold, the edge being co-linear if said ratio is less than said predetermined short edge threshold.

19. The method of claim 14 wherein the step of triangulating said opening comprises the steps of:

calculating an angle value for each remaining vertex defining said opening;

removing a vertex with a smallest of said angle values from said opening;

connecting vertices adjacent to said removed vertex forming a triangle;

determining whether a ratio of the triangle height to base length is less than a predetermined thinness threshold; and replacing said vertex removed if said ratio is less than said thinness threshold.

\* \* \* \* \*